US010922906B2

(12) United States Patent
Wang et al.

(10) Patent No.: US 10,922,906 B2
(45) Date of Patent: Feb. 16, 2021

(54) MONITORING AND DIAGNOSING VEHICLE SYSTEM PROBLEMS USING MACHINE LEARNING CLASSIFIERS

(71) Applicant: GM GLOBAL TECHNOLOGY OPERATIONS LLC, Detroit, MI (US)

(72) Inventors: Yue-Yun Wang, Troy, MI (US); Ibrahim Haskara, Macomb, MI (US); David Sun, Shanghai (CN); Yusheng Zou, Northville, MI (US); Shiming Duan, Ann Arbor, MI (US); Chi-kuan Kao, Troy, MI (US); Xiangxing Lu, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 56 days.

(21) Appl. No.: 16/367,827

(22) Filed: Mar. 28, 2019

(65) Prior Publication Data
US 2020/0312056 A1  Oct. 1, 2020

(51) Int. Cl.
*G07C 5/08* (2006.01)
*G06N 20/00* (2019.01)
*B60W 50/02* (2012.01)

(52) U.S. Cl.
CPC ....... *G07C 5/0808* (2013.01); *B60W 50/0205* (2013.01); *G06N 20/00* (2019.01); *G07C 5/0816* (2013.01); *B60W 2050/021* (2013.01)

(58) Field of Classification Search
CPC .... G07C 5/0808; G07C 5/0816; G06N 20/00; B60W 50/0205; B60W 2050/021
See application file for complete search history.

(56) References Cited

U.S. PATENT DOCUMENTS

| 2016/0188876 | A1* | 6/2016 | Harris | G06F 21/554 726/23 |
|---|---|---|---|---|
| 2016/0314632 | A1* | 10/2016 | Lu | G07C 5/085 |
| 2017/0221069 | A1* | 8/2017 | Remboski | G07C 5/006 |
| 2017/0278323 | A1* | 9/2017 | Gupta | H04W 64/00 |
| 2018/0144388 | A1* | 5/2018 | Mattern | G01C 21/3679 |
| 2019/0095725 | A1* | 3/2019 | Kalghatgi | G06K 9/00791 |
| 2019/0130664 | A1* | 5/2019 | Appel | B60W 40/09 |
| 2019/0138423 | A1* | 5/2019 | Agerstam | G06N 3/0445 |
| 2019/0156600 | A1* | 5/2019 | Potyrailo | F16N 29/04 |

* cited by examiner

*Primary Examiner* — Rodney A Butler
(74) *Attorney, Agent, or Firm* — Cantor Colburn LLP

(57) ABSTRACT

A system for monitoring operation of a vehicle includes a processing device including an interface configured to receive measurement data from sensing devices configured to measure parameters of a vehicle system. The processing device is configured to receive measurement data from each of the plurality of sensing devices, and in response to detection of a malfunction in the vehicle, input at least a subset of the measurement data to a machine learning classifier associated with a vehicle subsystem, the classifier configured to define a class associated with normal operation of the vehicle subsystem. The processing device is also configured to determine whether the subset of the measurement data belongs to the class, and based on at least a selected amount of the subset of the measurement data being outside of the class, output a fault indication, the fault indication identifying the vehicle subsystem as having a contribution to the malfunction.

20 Claims, 7 Drawing Sheets

MONITORING AND DIAGNOSING VEHICLE SYSTEM PROBLEMS USING MACHINE LEARNING CLASSIFIERS

INTRODUCTION

The subject disclosure relates to the art of motor vehicles and, more particularly, to a system and method for testing of, or performing diagnostics for, components of an internal combustion engine.

Modern vehicles require a variety of subsystems to control various aspects of vehicle operations. Vehicle engines generally include subsystems and components for controlling engine operation, air flow and cooling, fuel injection, exhaust and other operations. When a malfunction occurs, such as a rough idle or misfiring, the cause of such malfunction may not be readily discernable. As there can be many potential causes of a vehicle malfunction, it can be a challenge to narrow the cause to specific subsystems or components.

SUMMARY

In one exemplary embodiment, a system for monitoring operation of a vehicle includes a processing device including an interface configured to receive measurement data from a plurality of sensing devices, each sensing device of the plurality of sensing devices configured to measure a parameter of a vehicle system. The processing device is configured to receive measurement data from each of the plurality of sensing devices, and in response to detection of a malfunction in the vehicle, input at least a subset of the measurement data to a machine learning classifier associated with a vehicle subsystem, the classifier configured to define a class associated with normal operation of the vehicle subsystem. The processing device is also configured to determine by the classifier whether the subset of the measurement data belongs to the class, and based on at least a selected amount of the subset of the measurement data being outside of the class, output a fault indication, the fault indication identifying the vehicle subsystem as having a contribution to the malfunction.

In addition to one or more of the features described herein, the classifier is configured to plot the subset of the measurement data as position vectors in a feature space having axes representing parameters related to operation of the vehicle subsystem, the feature space including a boundary that defines a region of the feature space associated with a healthy condition of the vehicle subsystem.

In addition to one or more of the features described herein, the classifier is configured to output the fault indication based on a selected proportion of the position vectors being outside of the region.

In addition to one or more of the features described herein, the classifier is a one-class classifier, and the class is a healthy class representing normal operation of the vehicle subsystem.

In addition to one or more of the features described herein, the vehicle includes a plurality of vehicle subsystems, and the processing device is configured to input a respective subset of the measurement data to each of a plurality of one-class classifiers, each one-class classifier associated with a different vehicle subsystem. The processing device is also configured to determine, for each one-class classifier, whether the respective subset belongs to the healthy class, and based on at least one classifier determining that the respective subset does not belong to the healthy class, identify which of the plurality of vehicle subsystems has a contribution to the malfunction.

In addition to one or more of the features described herein, the plurality of one-class classifiers includes an air subsystem classifier, a fuel subsystem classifier and an ignition subsystem classifier.

In addition to one or more of the features described herein, the classifier includes a plurality of two-dimensional one-class classifiers, each one-class classifier configured to receive measurement data for a pair of parameters, and the processing device is configured to identify one or more individual components or vehicle subsystem as having a contribution to the malfunction by comparing outputs from the plurality of one-class classifiers to a knowledge base.

In addition to one or more of the features described herein, the classifier is a two-class classifier having a healthy class associated with normal operation of the vehicle subsystem, and a faulty class.

In addition to one or more of the features described herein, the classifier is a multi-class classifier having at least three classes associated with a plurality of vehicle subsystems and/or components.

In addition to one or more of the features described herein, the at least three classes include a healthy class associated with normal operation of all of the plurality of vehicle subsystems or components, and a faulty class for each vehicle subsystem and/or component.

In one exemplary embodiment, a method of monitoring operation of a vehicle includes receiving measurement data from a plurality of sensing devices by a processing device, each sensing device of the plurality of sensing devices configured to measure a parameter of a vehicle system, and in response to detection of a malfunction in the vehicle, inputting at least a subset of the measurement data to a machine learning classifier associated with a vehicle subsystem, the classifier configured to define a class associated with normal operation of the vehicle subsystem. The method also includes determining by the classifier whether the subset of the measurement data belongs to the class, and based on at least a selected amount of the subset of the measurement data being outside of the class, outputting a fault indication, the fault indication identifying the vehicle subsystem as having a contribution to the malfunction.

In addition to one or more of the features described herein, the classifier is configured to plot the subset of the measurement data as position vectors in a feature space having axes representing parameters related to operation of the vehicle subsystem, the feature space including a boundary that defines a region of the feature space associated with a healthy condition of the vehicle subsystem.

In addition to one or more of the features described herein, the method further includes outputting the fault indication from the classifier based on a selected proportion of the position vectors being outside of the region.

In addition to one or more of the features described herein, the classifier is a one-class classifier, and the class is a healthy class representing normal operation of the vehicle subsystem.

In addition to one or more of the features described herein, the method further includes inputting a respective subset of the measurement data to each of a plurality of one-class classifiers, each one-class classifier associated with one of a plurality of vehicle subsystems. The method further includes determining, for each one-class classifier, whether the respective subset belongs to the healthy class, and based on at least one classifier determining that the respective subset does not belong to the healthy class, identifying which of the plurality of vehicle subsystems has a contribution to the malfunction.

In addition to one or more of the features described herein, the plurality of one-class classifiers includes an air subsystem classifier, a fuel subsystem classifier and an ignition subsystem classifier.

In addition to one or more of the features described herein, the classifier includes a plurality of two-dimensional one-class classifiers, each one-class classifier configured to receive measurement data for a pair of parameters, the method further comprising identifying one or more individual components or vehicle subsystem as having a contribution to the malfunction by comparing outputs from the plurality of one-class classifiers to a knowledge base.

In addition to one or more of the features described herein, the classifier is a two-class classifier having a healthy class associated with normal operation of the vehicle subsystem, and a faulty class.

In addition to one or more of the features described herein, the classifier is a multi-class classifier having at least three classes associated with a plurality of vehicle subsystems and/or components.

In addition to one or more of the features described herein, the at least three classes include a healthy class associated with normal operation of all of the plurality of vehicle subsystems or components, and a faulty class for each vehicle subsystem and/or component.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
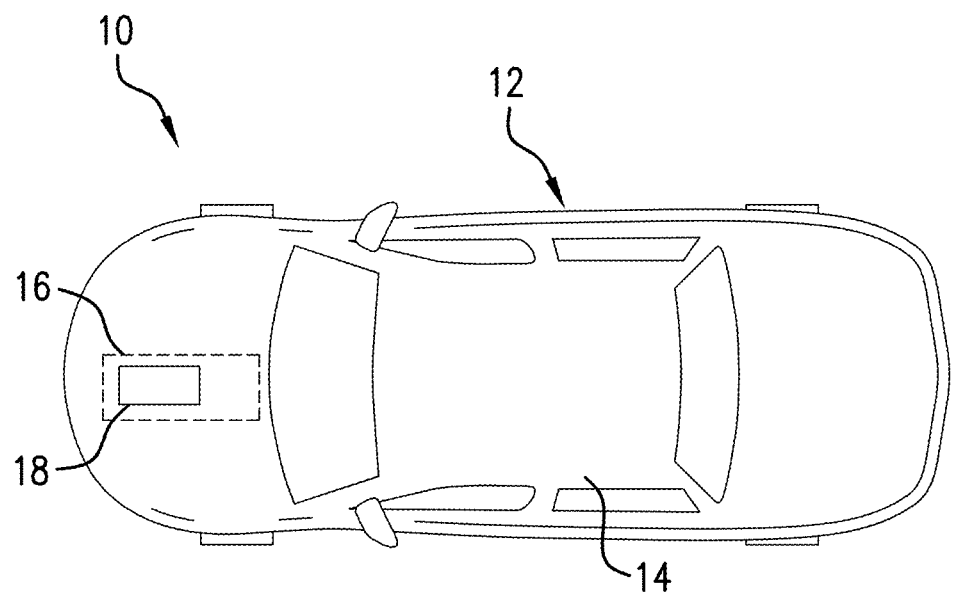
FIG. 1 is a top view of a motor vehicle including an internal combustion engine.

The following description is merely exemplary in nature and is not intended to limit the present disclosure, its application or uses.

In accordance with one or more exemplary embodiments, methods and systems for monitoring components of an internal combustion engine are described herein. An embodiment of a monitoring system includes a processing device configured to receive measurement data from a vehicle system and to apply at least a subset of the measurement data to one or more machine learning based classifiers. An example of a classifier is a support vector machine (SVM).

Each classifier is trained with training data associated with a given class, and a subset of measurement data is input to the classifier to determine whether the subset of the measurement data (or at least a significant amount of the subset) belongs to one or more classes. For example, a one-class classifier is trained with pre-existing measurement data or other known data related to a vehicle subsystem (referred to as training data) to establish ranges of data values belonging to a "healthy" class.

In one embodiment, the monitoring system includes a plurality of one-class classifiers, each classifier associated with one of a plurality of vehicle subsystems. For example, a classifier can be provided for an engine subsystem, a combustion subsystem, an air subsystem, a fuel subsystem and/or an ignition subsystem. When a vehicle malfunction is detected, the monitoring system inputs a subset of measurement data to each classifier. If a classifier determines that a statistically significant amount of data (for example, a selected proportion of the total number of data points from the subset) is outside of the healthy class, the classifier outputs a fault indication. In this way, the monitoring system and/or a user can readily identify each subsystem that contributed, or potentially contributed, to the malfunction.

In one embodiment, the monitoring system includes at least one two-class classifier configured to classify measurement data based on a healthy class and a "faulty" class. In this embodiment, the classifier outputs a fault indication if a selected amount of input measurement data is classified as belonging to the faulty class.

In one embodiment, the system includes a multi-class classifier configured to determine whether measurement data falls into one or more of at least three classes. The three classes can include, for example, a healthy class indicating that a subsystem associated with the classifier is operating normally, and a respective faulty class for each of a plurality of components of subsystems in the associated subsystem. Outputs from each classifier can be input to a reasoning module that uses knowledge base reasoning to determine which subsystems or components may be contributing to a vehicle malfunction and isolate subsystem faults.

Embodiments described herein have numerous advantages. For example, the system provides a way to identify specific sources of an engine misfire malfunction or other problem. In conventional vehicle systems and diagnostic systems, it can be difficult to narrow down the possible root cause of a problem. Embodiments described herein provide for reliable and quick detection of subsystem faults, and isolation of which subsystems of a vehicle contribute to a vehicle malfunction or problem. Embodiments also provide for identification of individual system components that may contribute to a malfunction.

FIG. 1 shows an embodiment of a motor vehicle 10, which includes a vehicle body 12 defining, at least in part, an occupant compartment 14. The vehicle body 12 also supports various vehicle subsystems including an engine assembly 16 including an internal combustion engine 18. The vehicle body 12 supports a number of additional subsystems to support functions of the engine assembly 16 and other vehicle components and systems, such as transmissions, batteries and motors. Other subsystems include, for example, a fuel injection subsystem, an air subsystem, an exhaust subsystem and a cooling subsystem.

Figure 2:
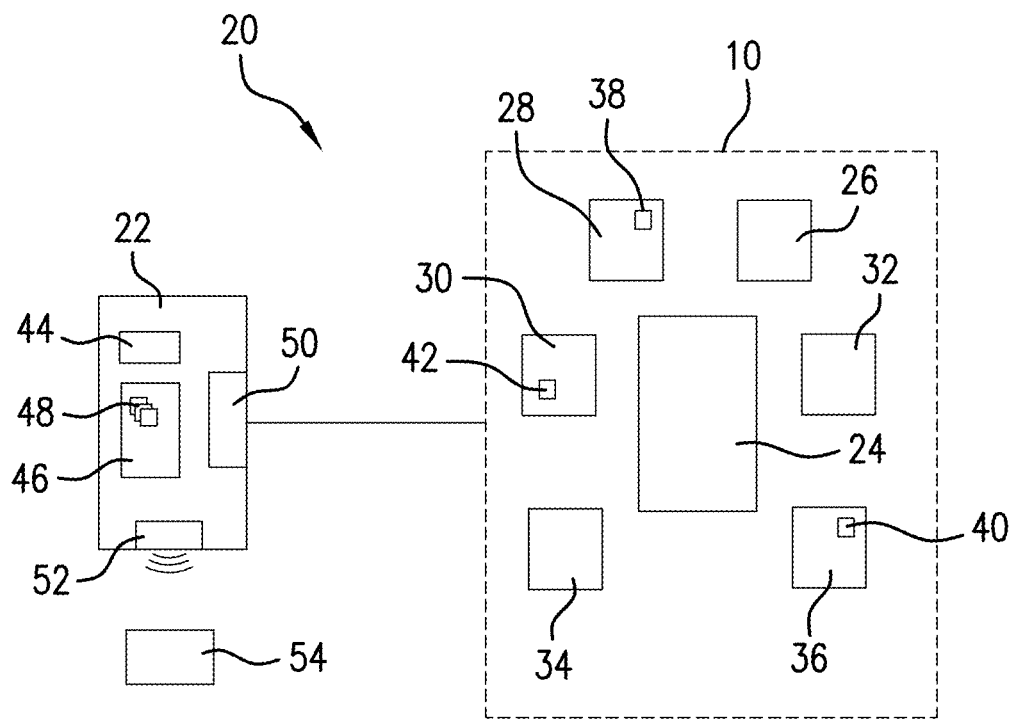
FIG. 2 depicts a monitoring and/or diagnostic system having a processing device that includes machine learning classifiers, in accordance with an aspect of an exemplary embodiment.

FIG. 2 depicts an embodiment of a monitoring and/or diagnostic system 20 configured to monitor various engine subsystems and identify problems in individual subsystems that can result in failure, fault or otherwise sub-optimal performance. The monitoring system 20 includes a processing device 22, which can be an onboard processor in the vehicle 10 or a processing device remote from the vehicle 10, such as a server, a personal computer or a mobile device (for example, a smartphone or tablet). For example, the processing device 22 can be part of, or in communication with, one or more engine control units (ECU), one or more vehicle control modules, one or more test fleet data flight recorders, a cloud computing device, a vehicle satellite communication system and/or others. The processing device 22 communicates with and/or otherwise monitors various subsystems in the vehicle 10.

For example, the vehicle 10 includes an engine subsystem 24 that includes an engine block, a crankshaft, connecting rods and pistons. A fuel injection subsystem 26 includes components such as fuel lines, fuel injectors and fuel pumps, and an air and/or cooling subsystem 28 includes components such as air compressors, air throttles, and air intake valves. Other subsystems may include an ignition subsystem 30 having components such as spark plugs, ignition coils and batteries, a lubrication subsystem 32, a transmission subsystem 34 and an exhaust subsystem 36. The vehicle 10 is not limited to the specific embodiments described herein, as the vehicle 10 may have any number and type of suitable subsystems.

Each subsystem may have, or be in operable communication with, one or more associated sensors and/or virtual sensors. For example, the air subsystem 28 includes sensors such as one or more mass airflow sensors or airflow estimators 38. The exhaust subsystem 36 includes one or more oxygen sensors 40, and the ignition subsystem 30 includes one or more current and/or voltage sensors 42.

The processing device 22 includes one or more processors or processing units 44 and a system memory 46. The system memory 46 may include a variety of computer system readable media. Such media can be any available media that is accessible by the processing unit 44, and may include both volatile and non-volatile media, removable and non-removable media.

The system memory 46 can include at least one program product having a set (e.g., at least one) of program modules that are configured to carry out functions of the embodiments described herein. For example, the system memory 46 stores a program/utility having a set of program modules 48. The program/utility may be or include an operating system, one or more application programs (for example, programs associated with data analytics and/or machine learning) and other program modules, and program data. The program modules 48 may generally carry out some or all of the functions and/or methodologies of embodiments described herein. For example, the program modules 48 can include modules for acquiring input data from the vehicle 10, modules including or configured as classifiers for identifying components or subsystems that may contribute to a vehicle malfunction, output modules, display modules, user interfaces, and others.

The processing device 22 also includes an interface 50 configured to communicate with various subsystems associated with the vehicle 10. The interface 50 can be used for wired communication and/or wireless communication. For example, the processing device 22 can be an onboard computer connected to sensors and control units in the vehicle 10. The processing device 22 may also include an interface 52 for communicating with other locations and devices. For example, the interface 52 is configured to communicate wirelessly (for example, by a cellular or satellite connection) to a remote location such as a server, support center, dealership and/or service station 54.

It is noted that embodiments described herein may be performed in conjunction with the processing device 22, but are not so limited. For example, all or part of the monitoring and diagnostic functions described herein can be performed by one or more processing devices in the vehicle, such as an engine control unit (ECU).

The monitoring system 20 is configured to monitor various subsystems of the vehicle 10 and to identify individual subsystems and/or components that cause or contribute to a vehicle malfunction, such as engine misfires. In one embodiment, the monitoring system 20 utilizes artificial intelligence and/or machine learning to generate one or more classifiers. Each classifier can receive measurement data from sensing devices in the vehicle 10 and determine by a classification algorithm whether the measurement data belongs to a class. For example, each classifier can determine whether measurement data belongs to a class associated with normal function of a subsystem (referred to herein as a "healthy" class), and identify the subsystem as causing or contributing to a malfunction if the measurement data does not belong to the healthy class.

Generally, a classifier is a processing module or algorithm configured to analyze measurement data and determine whether the measurement data falls into a class. The classifier may be configured to determine whether data falls into a single class, falls into one of two classes, or falls into one of three or more classes. The classes, in one embodiment, each point to a healthy system, subsystem or component, or point to a subsystem or a component fault. As discussed further below, a class can be established by training the classifier using selected features as training data. The training data may be, for example, data selected from the most relevant sensor measurements, virtual sensor values, or model parameters. The training data is data previously collected from measurements taken during normal vehicle operation and/or known information related to abnormal operation of vehicles associated with known failure modes. For example, the training data can include simulation and/or prior measurement data from the vehicle 10 and/or from similar vehicles and/or other vehicles with similar subsystems. In one embodiment, each classifier uses a support vector machine (SVM).

Figure 3:
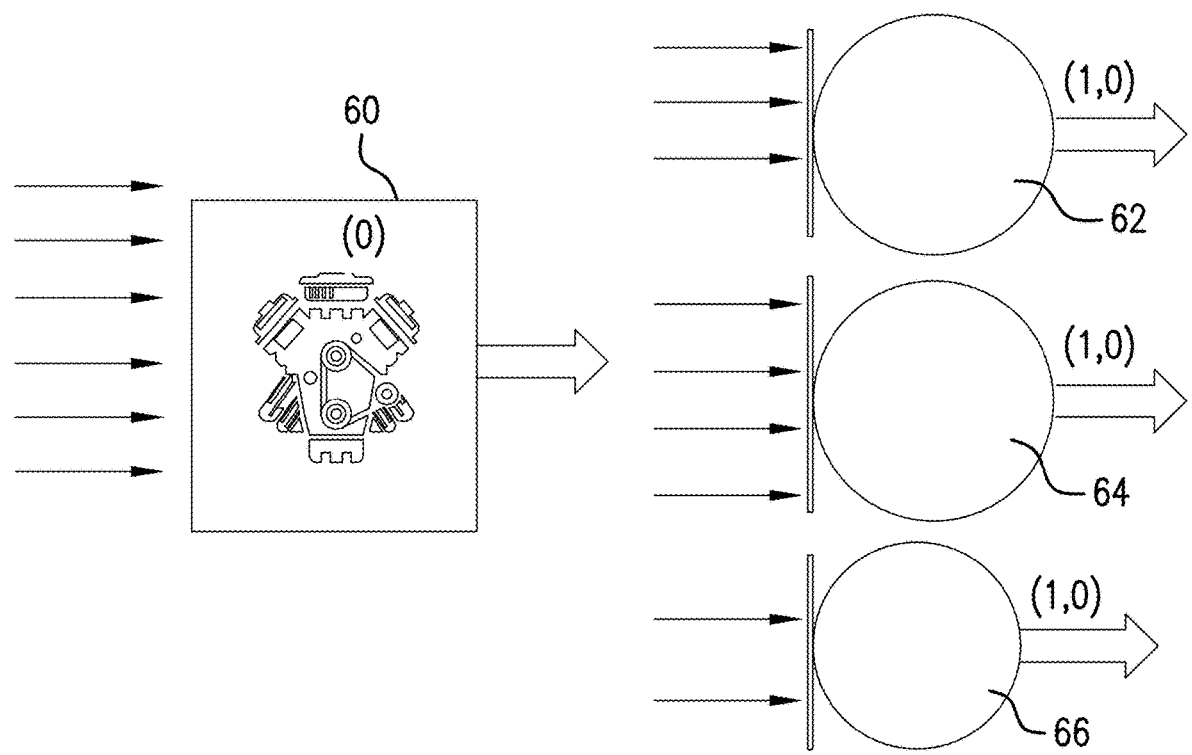
FIG. 3 depicts multiple one-class classifiers used for analyzing measurement data to identify one or more potential sources of a vehicle malfunction, in accordance with an aspect of an exemplary embodiment.

FIG. 3 depicts an embodiment of classifiers that can be utilized by the monitoring system 20 of FIG. 2. In this embodiment, the monitoring system 20 includes one or more one-class classifiers (for example, SVMs). The one-class classifiers include a combustion or engine subsystem classifier 60, an air subsystem classifier 62, a fuel subsystem classifier 64 and an ignition subsystem classifier 66. Each classifier receives measurement data associated with the classifier's respective subsystem, and determines whether the measurement data is in a "healthy" class. In one embodiment, the measurement data is in the healthy class if a statistically significant number of data points from the measurement data are in the healthy class. Conversely, if a selected number or proportion of the data points are determined by a classifier to be outside of the healthy class, the monitoring system 20 can identify the subsystem associated with the classifier as contributing, or potentially contributing, to a malfunction. The healthy class for each classifier is trained with training data that includes previously collected measurement data associated with the classifier's respective subsystem.

For example, the classifier 60 is a combustion subsystem classifier that analyzes measurement data associated with the combustion subsystem. The combustion subsystem classifier 60 receives combustion system data as feature inputs, such as misfire count (number of engine misfires over a selected time period) or knock, air fuel ratio (AFR), fuel trim from AFR sensors, oxygen (O2) level from O2 sensors, engine torque, throttle position (TPS), spark timing and others.

The air subsystem classifier 62 receives air subsystem data as feature inputs, such as air per cylinder (APC), measured mass air flow (MAF), throttle position (TPS) and/or intake manifold pressure (MAP). In one embodiment, the input data includes residuals, or differences between measured data values and estimated or expected data values. For example, the inputs include an APC residual (difference between desired APC and measured APC), an MAF residual (difference between estimated or modeled MAF and measured MAF), a TPS residual (difference between desired TPS and measured TPS), and an MAP residual (difference between estimated MAP and measured MAP).

The fuel subsystem classifier 64 receives fuel subsystem data as feature inputs, such as low pressure (LP) fuel line pressure, LP motor control duty cycle trim, and high pressure (HP) fuel rail pressure and fuel flow. In one embodiment, the input data includes residuals, such as an LP fuel line residual (difference between a desired LP fuel line pressure and measured LP fuel line pressure) and/or a HP fuel rail pressure residual (difference between desired HP fuel rail pressure and measured HP fuel rail pressure). The ignition subsystem classifier 66 receives ignition subsystem data as feature inputs, such as primary ignition current and/or ignition voltage.

In another example, the classifier 60 is an engine subsystem classifier that receives combustion system data and additional data relating to the engine subsystem. Examples of such additional data include fuel flow and pressure, revolutions per minute (RPM), MAF residual, LP fuel line pressure residual, HP fuel rail pressure residual, intake pressure, intake temperature and others.

In operation, in response to detection of a malfunction or other problem in the vehicle, the classifier 60 receives combustion subsystem measurement data and/or additional measurement data, and determines whether the measurement data belongs to a healthy class. In one embodiment, the classifier 60 inputs data points from the measurement data into a feature space, which can be two-dimensional or have any number of dimensions. A healthy class is defined by a boundary selected within the feature space based on training data. If the measurement data is within the boundary, the measurement data is in the healthy class. An indicator may be output, such as a numerical value. For example, if the measurement data is in the healthy class, the classifier can output a value of zero.

If a sufficient number of data points are not within the boundary, the classifier 60 outputs a non-healthy indication or "fault signal." The fault signal can be, for example, a value of one. The fault signal can be output to another location or a user (e.g., a driver or technician), or output to other classifiers or processing modules.

In one embodiment, the classifier 60 outputs a fault signal to one or more additional subsystem classifiers to identify specific subsystems that contribute or potentially contribute to the malfunction. For example, if the classifier 60 outputs a fault signal, each of the air, fuel and ignition subsystem classifiers are triggered to analyze measurement data and determine whether a significant number of measurement data points fall within or outside a healthy class. The number of data points can be compared to a threshold number, which can be determined from calibration based on measurements taken during normal vehicle operation.

The results from each classifier are output and used to determine which subsystem caused or at least contributed to the problem. For example, if the air subsystem classifier 62 outputs an indication that the received measurement data is not part of a healthy class, the air subsystem classifier 62 outputs a corresponding fault signal (for example, a value of one). If the fuel and ignition subsystem classifiers 64 and 66 output healthy signals (for example, a value of zero), then a user or the processing device 22 can narrow potential causes of the malfunction to the air subsystem.

It is noted that classifiers can be utilized for broadly characterized subsystems, such as the air subsystem, or for more narrowly characterized subsystems or components. For example, a classifier may be configured to monitor part of the air subsystem for a first engine bank, and another classifier may be configured to monitor part of the air subsystem for a second engine bank.

In another example, individual components can be monitored using respective classifiers. For example, a HP fuel pump classifier can be configured to monitor a HP fuel pump using HP fuel rail pressure and fuel flow measurements as input data, and a LP fuel pump classifier can be configured to monitor a LP fuel pump using LP fuel line pressure and fuel flow measurements as input data. If a malfunction is detected, the monitoring system 20 inputs associated measurement data to each classifier to identify which subsystems and/or individual components may be contributing to the malfunction.

As noted above, in one embodiment, each classifier can be a linear or non-linear support vector machine (SVM), which classifies measurement data as belonging (or not belonging) to one or more classes based on whether measurement data is within a boundary defined within a coordinate system or feature space. The boundary may be linear or non-linear.

Figure 4:
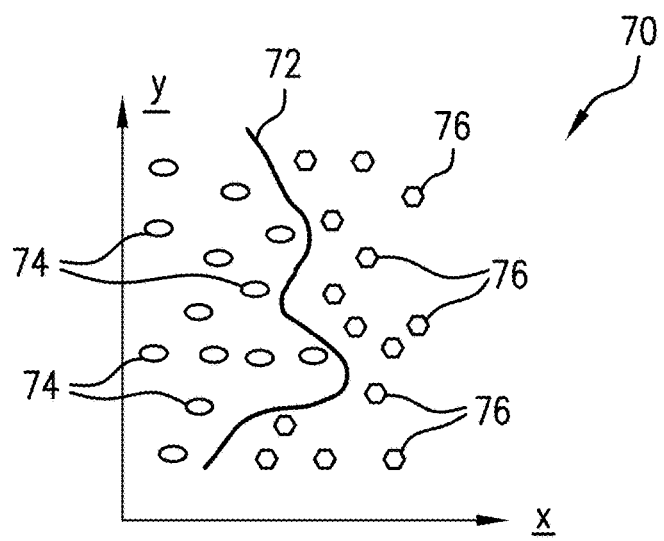
FIG. 4 depicts an example of data classified by a one-class classifier, in accordance with an aspect of an exemplary embodiment.

FIG. 4 shows an example of a feature space 70 used by a classifier to analyze measurement data and determine whether such data belongs to a class. In this example, the classifier is a SVM that utilizes training data to establish a class (e.g., a healthy class).

The classifier uses training data to construct a boundary (referred to as a "hyperplane") in a two-dimensional or multi-dimensional space. In this example, the classifier uses a two-dimensional feature space 70, however higher dimensional spaces may be used. The feature space 70 includes axes associated with selected features, which can be parameters measured by various sensors.

Training data including multiple data points (vectors) is plotted in the two-dimensional feature space 70, and a hyperplane 72 is calculated that maximizes a distance or margin between data in different classes. The hyperplane 72 is then used to classify subsequent data points. For example, data points 74 within a portion of the space defined by the hyperplane are considered to be part of a given class (for example, a healthy class). Data points 76 are outliers (i.e., do not fall within the portion of the space) and accordingly are not considered to be part of the class.

Figure 5:
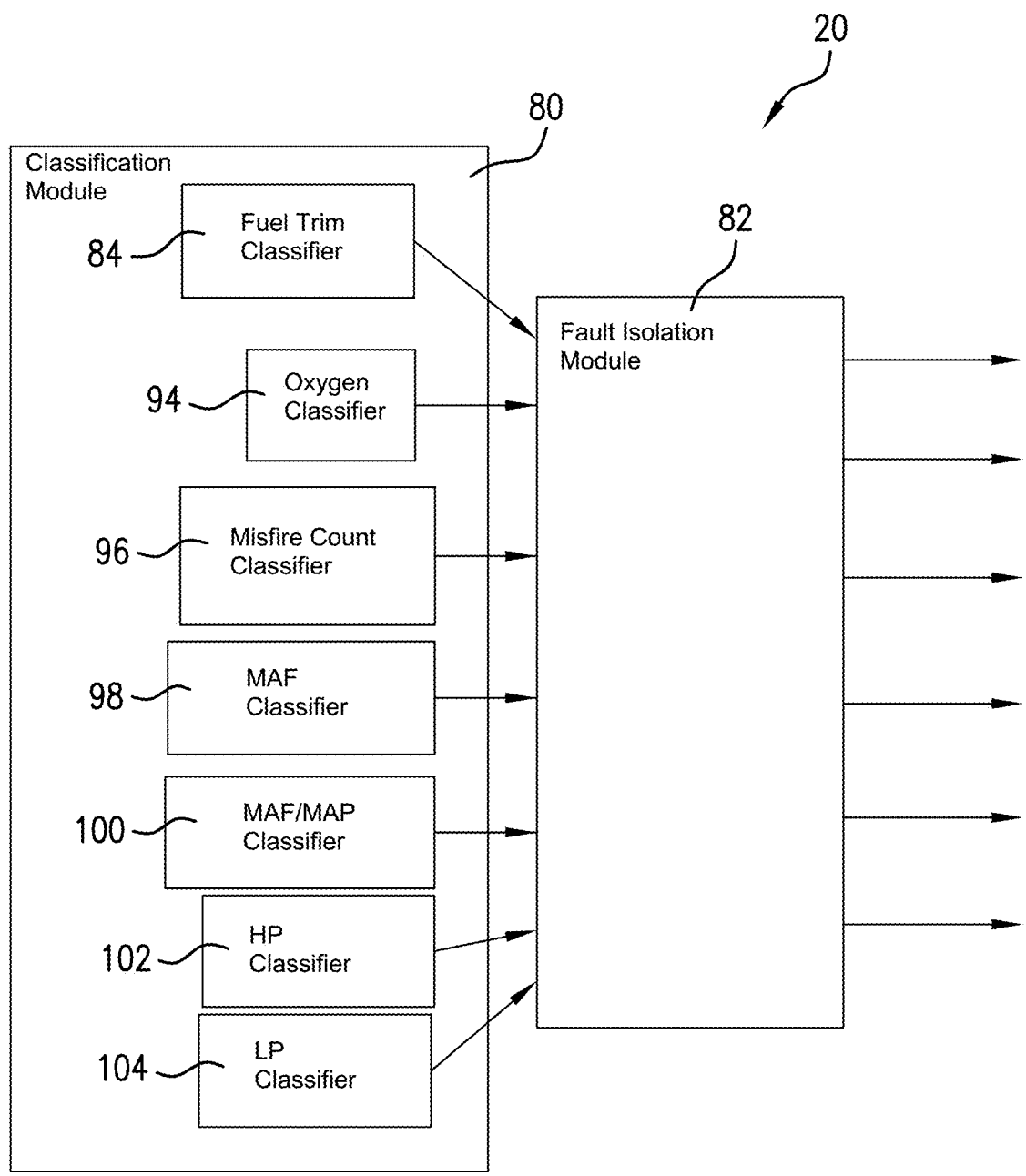
FIG. 5 depicts a processing module that includes multiple one-class classifiers used for analyzing measurement data to identify one or more potential sources of a vehicle malfunction, in accordance with an aspect of an exemplary embodiment.

Referring to FIG. 5, in one embodiment, the monitoring system 20 of FIG. 2, and/or the processing device 22 includes multiple one-class classifiers in combination with knowledge base information to isolate individual components in the vehicle system that contribute to a malfunction.

In this embodiment, the processing device 22 includes a classification module 80 having a plurality of two-dimensional (2D) one-class classifiers. Each one-class classifier outputs a healthy or fault signal based on whether associated measurement data belongs to a healthy class. Outputs from each classifier are input to a fault isolation or reasoning module 82, which determines whether individual components or subsystems contribute to a malfunction.

Each classifier is a 2D classifier that receives measurement data for two features, plots measurement data as position vectors in a feature space defined by the two features, and determines whether the data belongs to a healthy class based on whether the data or a significant amount is within a boundary or hyperplane.

In this embodiment, the classification module 80 includes a fuel trim classifier 84, which receives fuel trim measurements for a first bank ("Bank 1") of an engine (referred to as "Fueltrim1" measurements), and fuel trim measurements for a second bank ("Bank 2") of an engine (referred to as "Fueltrim2" measurements). The measurements are plotted in a feature space as data points or position vectors denoted as (Fueltrim1, Fueltrim2).

Figure 6:
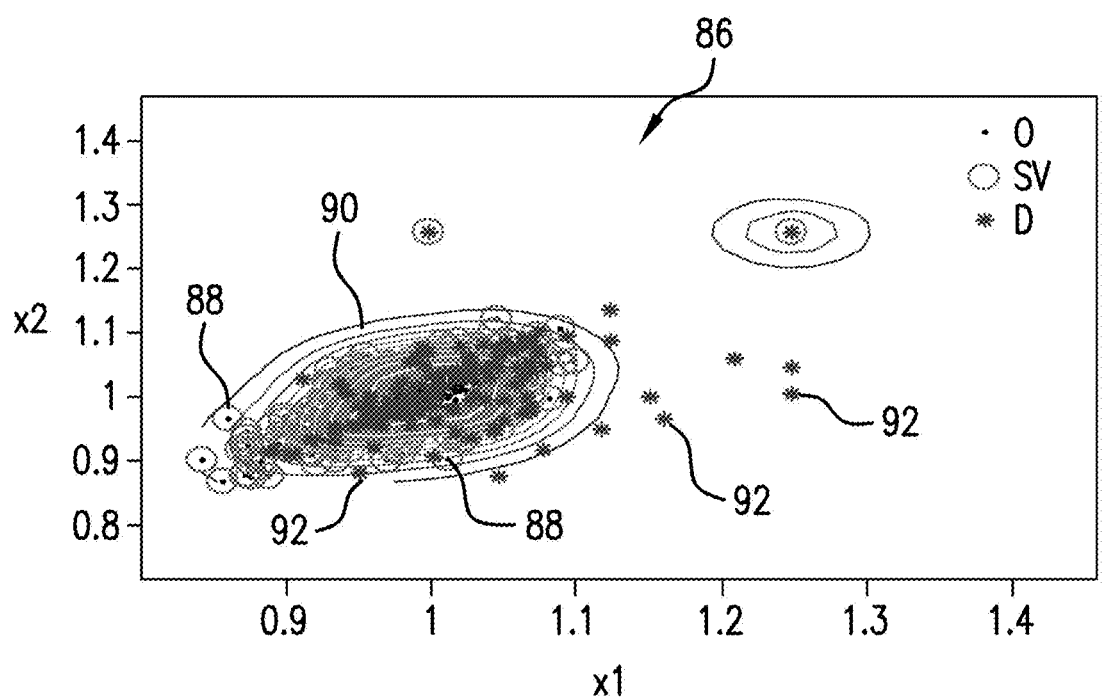
FIG. 6 depicts an example of data classified by a one-class classifier, in accordance with an aspect of an exemplary embodiment.

An example of a feature space 86 used by the fuel trim classifier 84 is shown in FIG. 6. In this example, the feature space 86 is defined by an axis x1 that represents normalized Fueltrim1 values and an axis x2 that represents normalized Fueltrim2 values. The feature space 86 includes support vectors ("SV") 88, which are observations ("O") or training data points that are used to define a hyperplane or boundary 90. The boundary 90 defines a healthy class. Paired Fueltrim1 and Fueltrim2 measurement values are plotted as measurement data vectors ("D") 92. In this example, a statistically significant number of measurement data vectors 92 are outliers. Thus, the fuel trim classifier 84 outputs a fault signal.

Referring again to FIG. 5, the classification module 80 includes other classifiers, such as an oxygen classifier 94 that classifies oxygen measurement data, such as oxygen level from Bank 1 and oxygen level from Bank 2. A misfire count classifier 96 receives and classifies misfire counts from Bank 1 and Bank 2. A MAF classifier 98 receives and classifies MAF residual measurement data and RPM measurements. A MAF/MAP classifier 100 receives and classifies MAF residual and MAP residual measurement data. An HP classifier 102 receives and classifies HP fuel rail pressure measurements and HP fuel rail pressure residuals. LP classifier 104 receives and classifies LP fuel line pressure measurements and LP fuel line pressure residuals.

Outputs from each 2D classifier are sent to the reasoning module 82, which uses the signals to determine whether and which components and/or subsystems are faulty. For example, fault signals from each classifier are associated with specific component or subsystem faults based on a knowledge base. The knowledge base can be stored in the processing device 22 or in a remote location such as a server or service station.

The monitoring system 20 may utilize classifiers that classify data into multiple classes. For example, one or more two-class classifiers may be used for a subsystem or subsystems, or one or more multi-class classifiers having more than two classes may be used.

Figure 7:
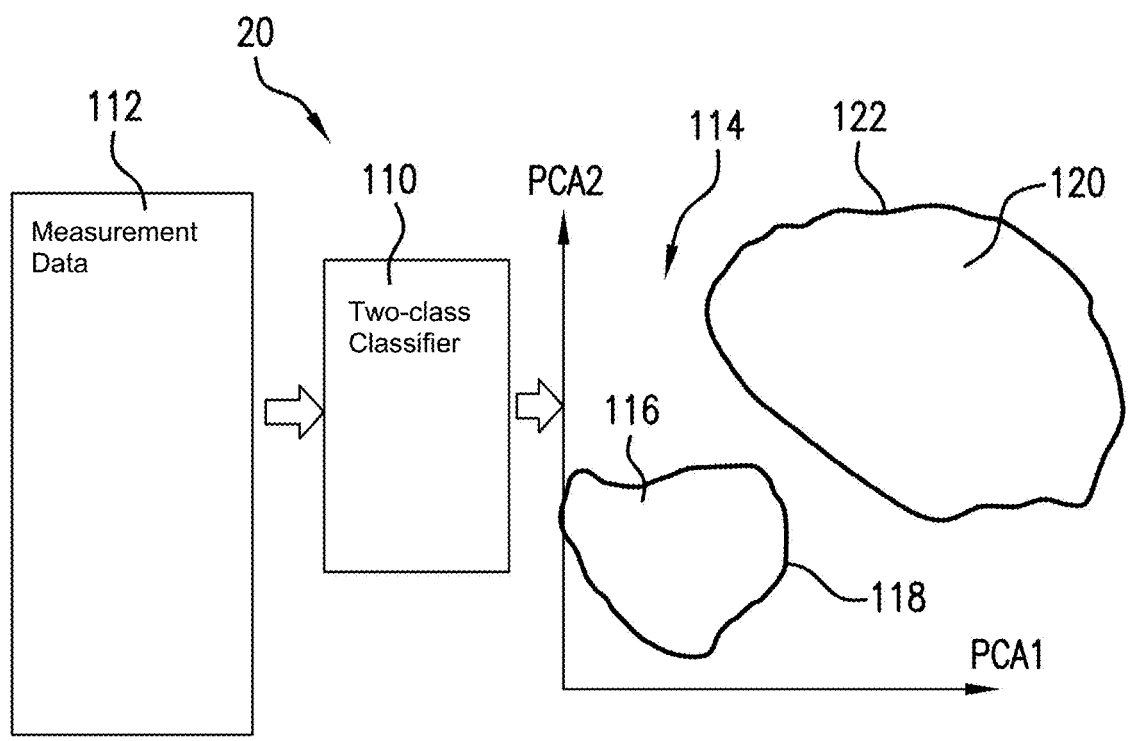
FIG. 7 depicts a processing module that includes a two-class classifier used for analyzing measurement data, in accordance with an aspect of an exemplary embodiment.

Referring to FIG. 7, in one embodiment, the monitoring system 20 of FIG. 2 and/or, the processing device 22 includes a two-class classifier 110 or multiple two-class classifiers 110. The two-class classifier 110 receives measurement data 112 and determines if the measurement data belongs to one of two classes. In one embodiment, the two-class classifier 110 plots measurement data 112 in a two-dimensional feature space 114 by selecting features (for example, parameter measurements) that best classify the data by principle component analysis (PCA), linear discriminate analysis (LDA) or another suitable technique. For example, a first class is a healthy class 116 defined by a hyperplane 118, and a second class is a non-healthy or faulty class 120 defined by a hyperplane 122.

The two-class classifier 110 can receive data from multiple subsystems. For example, the classifier 110 can receive data from air, fuel and ignition subsystems, and the faulty class 120 indicates that the problem is contributed by one of these subsystems if a significant amount of measurement data belongs to the faulty class 120.

Examples of measurement data include Fueltrim1, Fueltrim2, misfire counts, MAF residual, MAP residual, RPM, APC residual, TPS residual, HP fuel rail pressure residual (difference between a measured HP fuel rail pressure and a desired pressure), LP fuel line pressure residual (difference between a measured LP fuel line pressure and a desired LP fuel line pressure), HP pump control duty cycle and/or LP pump control duty cycle.

Figure 8:
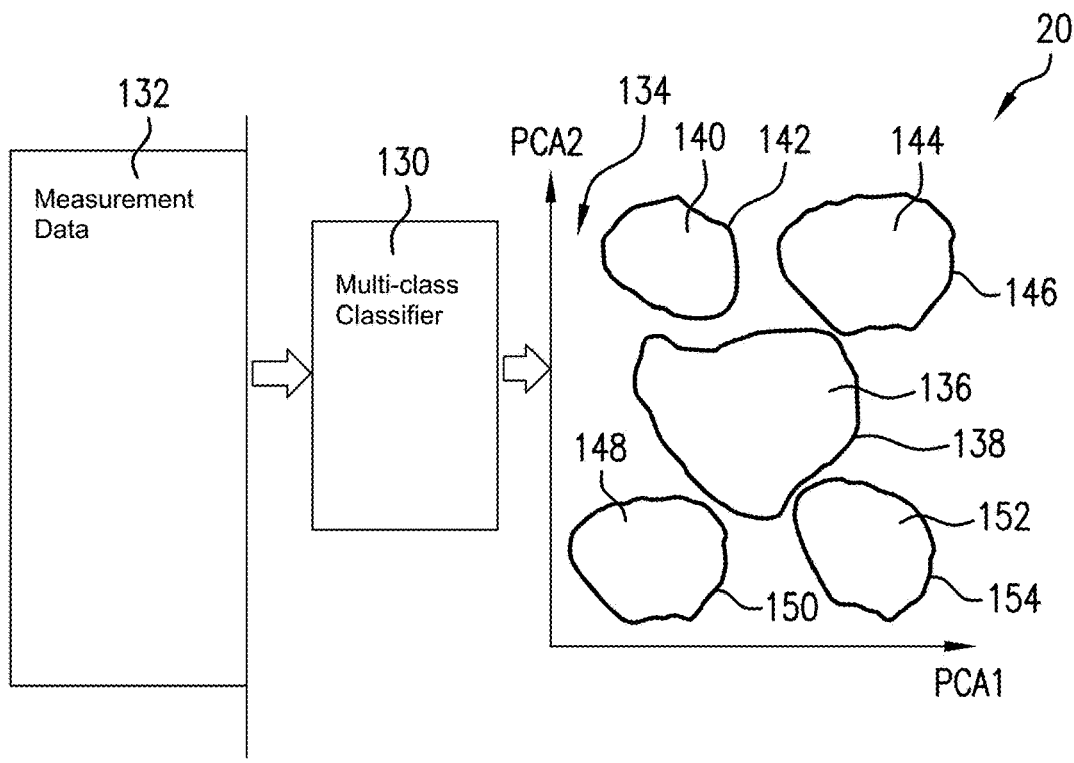
FIG. 8 depicts a processing module that includes a multi-class classifier used for analyzing measurement data, in accordance with an aspect of an exemplary embodiment.

Referring to FIG. 8, in one embodiment, the monitoring system 20 of FIG. 2, and/or the processing device 22 includes one or more multi-class classifiers using labeled healthy and faulty feature signals identified for combustion, air and fuel subsystems to detect and isolate various subsystem level faults.

An embodiment of a multi-class classifier 130 receives measurement data 132 and determines if the measurement data belongs to one of three or more classes. The multi-class classifier 130 can use, for example, a neural network (NNT) such as a perceptron NNT to classify training data in a feature space 134 in clusters representing various classes.

The classifier 130 can receive data from one or multiple subsystems. For example, the classifier 130 can receive data from an engine subsystem, which may include a number of other subsystems or components. Engine subsystem data includes, for example, Fueltrim1, Fueltrim2, misfire counts, MAF residual, MAP residual, RPM, APC residual, TPS residual, HP fuel rail pressure residual, LP fuel line residual, HP pump control duty cycle and/or LP pump control duty cycle.

The classifier 130 defines a feature space 134 having axes representing features selected via PCA, LDA or other suitable analysis. The feature space 134 includes an engine healthy class 136 defined by a hyperplane 138 and a number of faulty classes. For example, a Bank 1 air fault class 140 is defined by a hyperplane 142, representing a fault in the air subsystem connected to Bank 1, and a Bank 2 air fault class 144 is defined by a hyperplane 146, representing a fault in the air subsystem connected to Bank 2. A Bank 1 fuel fault class 148 is defined by a hyperplane 150, representing a fault in the fuel subsystem connected to Bank 1, and a Bank2 fuel fault class 152 is defined by a hyperplane 154, representing a fault in the fuel subsystem connected to Bank 2.

In one embodiment, the monitoring system 20 and/or classifier(s) are configured to output information regarding the probability that a faulty subsystem (i.e., a subsystem for which an associated classifier outputs a fault signal). For example, in addition to outputting a fault signal, a classifier (for example, any or all of the classifiers shown in FIGS. 3 and 5-8) compares the number of measurement data points (vectors) that fall within a class boundary to the number of measurement data points that are outliers. The ratio of measurement data points belonging to a healthy class to measurement data points outside the healthy class can be output as a percentage or probability that the associated subsystem or component is healthy. A probability below a selected threshold may trigger output of a fault signal. A healthy probability can also be output if the measurement data primarily falls within the healthy class. For example, referring again to FIG. 3, the air, fuel and ignition classifiers can each output a healthy probability or a classifier can output a fault signal if the probability that the subsystem is healthy is below a threshold.

In one embodiment, the monitoring system 20 is configured to record root causes for various sets of measurement data and record the root causes for comparison to subsequent measurements and malfunction detections. For example, when a set of measurements is input to the monitoring system 20 (as a result of detecting a malfunction), a set of measurement data is input to a classifier, or subsets of the set of measurement data are input to different classifiers. The monitoring system 20 then outputs the results to a technician, who can determine the root cause of the malfunction and enter the root cause into a knowledge base or database. The system 20 then records the root cause and the faulty data into a database. If the root cause is new or more accurate, the monitoring system 20 updates the database.

Figure 9:
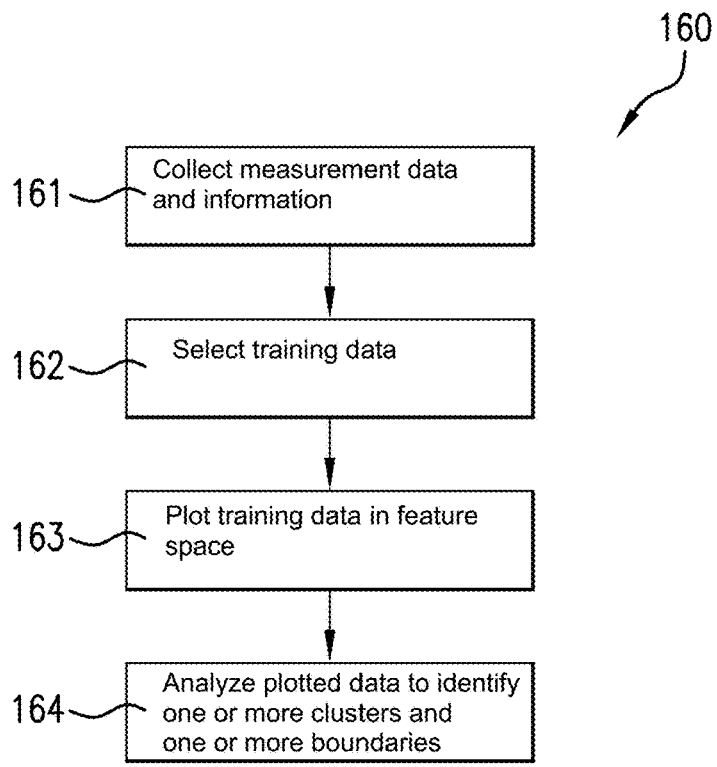
FIG. 9 is a flow chart depicting aspects of a method of training classifiers, in accordance with an aspect of an exemplary embodiment.

FIG. 9 depicts an embodiment of a method 160 of training one or more classifiers in the monitoring system 20 of FIG. 2. The monitoring system 20 or other processing device or system may be utilized for performing aspects of the method 160. The method 160 is discussed in conjunction with blocks 161-164. The method 160 is not limited to the number or order of steps therein, as some steps represented by blocks 160-164 may be performed in a different order than that described below, or fewer than all of the steps may be performed.

At block 161, the monitoring system 20 collects measurement data and other information from the vehicle 10 and/or other vehicles for use as training data. For example, data can be collected from a fleet of similar vehicles, such as vehicles having similar engine subsystems and/or of the same model.

At block 162, for each classifier, associated training data and features are selected. For example, for the air subsystem classifier 62, data such as APC, MAF, TPS and MAP data is selected as training data. Training data may include data collected during normal operation (healthy training data) and training data collected during faulty or sub-optimal operation (unhealthy training data).

At blocks 163 and 164, the healthy and unhealthy training data is plotted as position vectors in a feature space, and the plotted data is analyzed as discussed above to identify clusters and define a boundary (or boundaries) associated with one or more classes.

Figure 10:
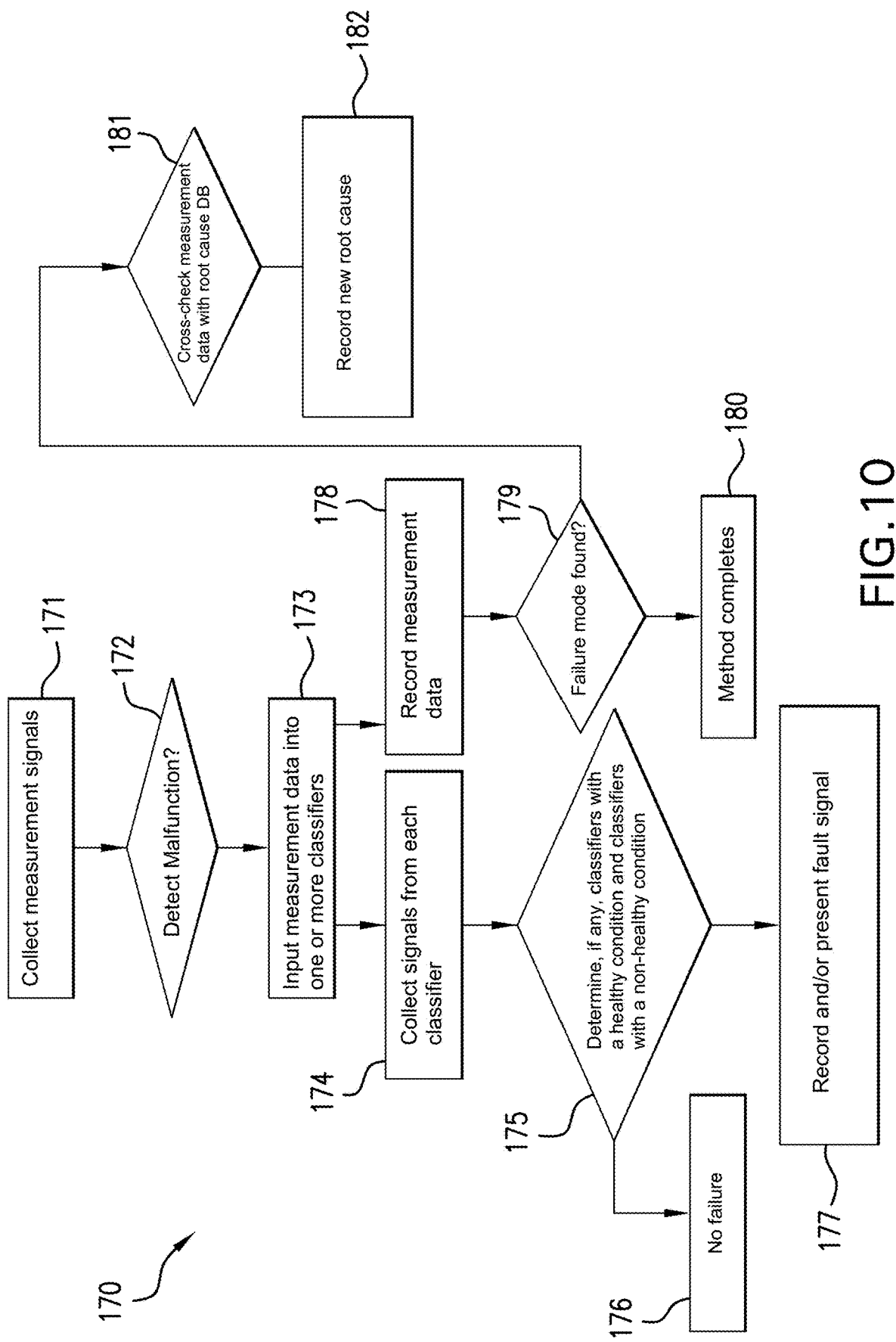
FIG. 10 is a flow chart depicting aspects of a method of monitoring a vehicle system and diagnosing a vehicle malfunction, in accordance with an aspect of an exemplary embodiment.

FIG. 10 depicts an embodiment of a method 170 of monitoring a vehicle system and diagnosing vehicle malfunctions or problems. The monitoring system 20 of FIG. 2 or other processing device or system may be utilized for performing aspects of the method 170. The method 170 is discussed in conjunction with blocks 171-182. The method 170 is not limited to the number or order of steps therein, as some steps represented by blocks 171-182 may be performed in a different order than that described below, or fewer than all of the steps may be performed.

The method 170 is discussed in conjunction with the system and classifiers of FIGS. 2 and 3 as an example. It is noted that discussion of the classifiers and the example are for illustrative purposes and are not intended to be limiting.

At block 171, measurement signals from various subsystems and sensors are collected during operation of a vehicle. For example, the monitoring system 20 monitors sensor measurements from various subsystems and records the measurements as measurement data. Measurement data can be collected from the vehicle and transferred to a server or other suitable storage location, and/or can be collected from the vehicle 10 by on-board vehicle processing devices such as an ECU. Measurement data can be transferred to the monitoring system 20 via any suitable means, such as cellular communication to a network or cloud.

At block 172, the monitoring system 20 monitors the vehicle subsystems and detects if a malfunction occurs. A malfunction may be any condition of the vehicle that causes a failure, fault or sub-optimal operation. For example, the system monitors the engine subsystem and detects any misfires that occur. When the number of misfires reaches or exceeds a selected threshold number, a malfunction is identified.

At block 173, upon identification of the malfunction, all or a subset of the measurement data is imported and input to one or more classifiers. For example, measurement data is input to the engine subsystem classifier 60, the air subsystem classifier 62, the fuel subsystem classifier 64 and the ignition subsystem classifier 66. At block 174, classifier signals are collected from each classifier.

At block 175, the monitoring system 20 determines which classifiers indicate a healthy condition and which indicate a non-healthy or faulty condition, i.e., output a fault signal. A subsystem associated with the classifier can be considered to be faulty and thus potentially contributing to the malfunction if the classifier outputs a fault signal. In one embodiment, each classifier outputs a healthy probability, and the monitoring system 20 determines a fault for each classifier (if any) having a healthy probability that is less than a threshold probability value.

At block 176, if no classifier outputs a fault signal or has a healthy probability less than the threshold, no failure is found for the associated subsystems. At block 177, if any of the classifiers outputs a fault signal, the fault signal (and probability if applicable) is recorded and/or presented to a user.

In one embodiment, the method 170 includes analyzing the recorded measurement data by another processing module or system, or by an expert or technician. At block 178, the measurement data is recorded, and at block 179, it is determined whether a failure mode was found. If no failure mode was found, the method 170 completes (block 180).

At block 181, if a failure mode was found, measurement data associated with the classifier or classifiers that output fault signals is cross-checked with a root cause database to determine whether similar measurement data was previously recorded and associated with a root cause. If not, at block 182, a new root cause is recorded, which can be used in subsequent diagnostics and/or used to train one or more classifiers.

Figure 11:
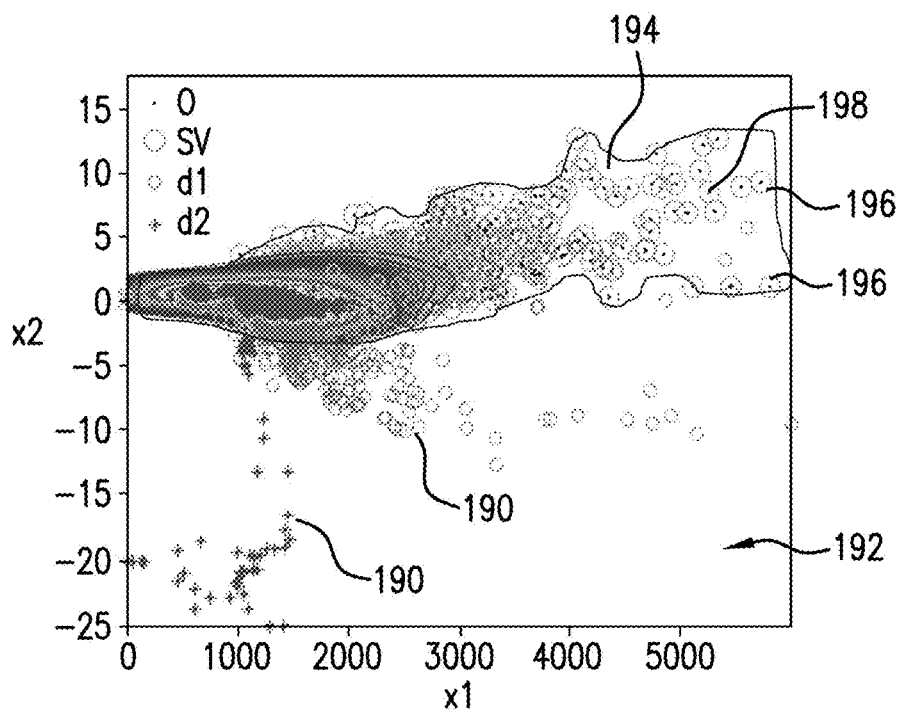
FIG. 11 depicts aspects of an example of diagnosing a vehicle malfunction using multiple classifiers, in accordance with an aspect of an exemplary embodiment.
Figure 11:
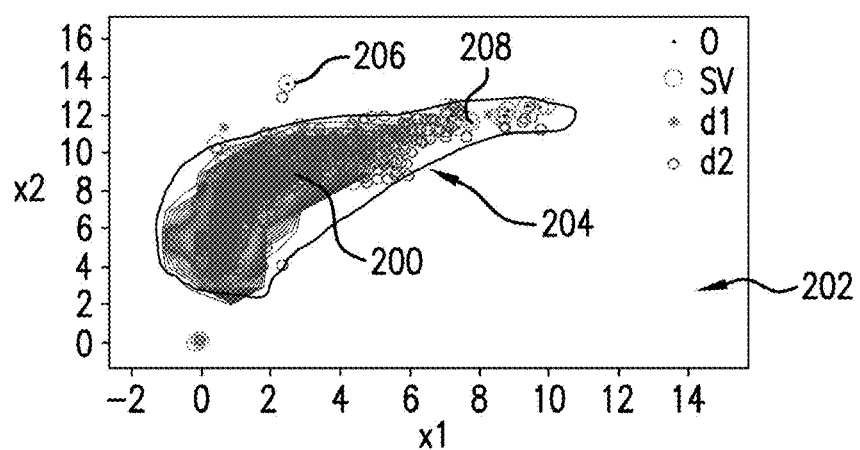
Figure 11:
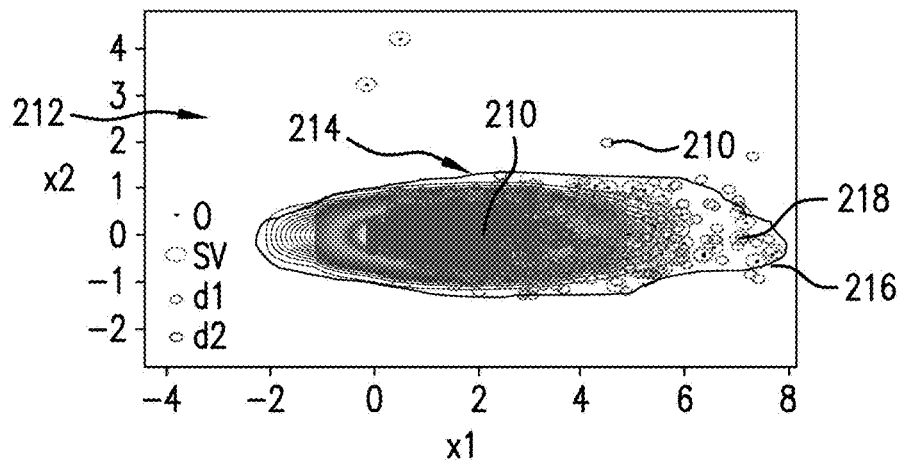

An example of the method 170 is shown in FIG. 11. In this example, the monitoring system 20 includes multiple one-class classifiers, which include an air subsystem classifier (such as the classifier of FIG. 3) and classifiers related to the fuel subsystem. The classifiers include a LP fuel pump classifier and a HP fuel pump classifier.

In this example, the air classifier plots measurement data as position vectors 190 (data points "d1" and "d2") in a feature space 192 having axes x1 and x2 representing RPM values and MAF residual values, respectively. The feature space 192 includes a healthy boundary 194 representing a healthy class, which is defined based on support vectors ("SV") 196. The support vectors 196 are selected from previously plotted training data or previous measurement data, which are shown as observations ("O") 198. As shown, there is a significant number of position vectors 190 that are outside of the boundary 194.

The HP fuel pump classifier plots measurement data (measured HP fuel rail pressure and fuel flow) as position vectors 200 in a feature space 202 having axes x1 and x2 representing HP fuel rail pressure values and fuel flow values, respectively. The feature space 202 includes a healthy boundary 204 representing a healthy class, which is defined based on support vectors 206. The support vectors 206 are selected from previously plotted training data or previous measurement data, which are shown as observations 208.

Likewise, the LP fuel pump classifier plots measurement data (LP fuel line pressure residual and measured fuel flow) as position vectors 210 in a feature space 212 having axes x1 and x2 representing LP line pressure residual values and fuel flow values, respectively. The feature space 212 includes a healthy boundary 214 representing a healthy class, which is defined based on support vectors 216. The support vectors 216 are selected from previously plotted training data or previous measurement data, which are shown as observations 218.

As shown, there is not a significant number of position vectors outside the healthy class boundaries for the LP fuel pump classifier or the HP fuel pump classifier, indicating that the HP fuel pump and the LP fuel pump are operating normally. Thus, the monitoring system 20 is able to narrow potential causes to an air subsystem problem. In a different scenario, if there is an engine misfire detected, which is not caused by the ignition subsystem, and the air system classifier and fuel pump classifiers all indicate healthy conditions, the root cause could most likely pin point to a fuel injector problem.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A system for monitoring operation of a vehicle, comprising:
a processing device including an interface configured to receive measurement data from a plurality of sensing devices, each sensing device of the plurality of sensing devices configured to measure a parameter of a vehicle system, the processing device including a plurality of machine learning classifiers, each classifier of the plurality of machine learning classifiers associated with a different vehicle subsystem of a plurality of vehicle subsystems, the processing device configured to perform:
receiving measurement data from each of the plurality of sensing devices, the measurement data having a plurality of subsets;
in response to detection of a malfunction in the vehicle, inputting a respective subset of the plurality of subsets to each classifier, wherein each classifier is configured to define a class associated with normal operation of a respective vehicle subsystem;
determining by each classifier whether the respective subset of the measurement data belongs to the class; and
based on one or more classifiers determining that at least a selected amount of the respective subset of the measurement data is outside of the class, outputting a fault indication, the fault indication identifying which of the plurality of vehicle subsystems has a contribution to the malfunction.

2. The system of claim 1, wherein each classifier is configured to plot the respective subset of the measurement data as position vectors in a feature space having axes representing parameters related to operation of the vehicle subsystem, the feature space including a boundary that defines a region of the feature space associated with a healthy condition of the vehicle subsystem.

3. The system of claim 2, wherein each classifier is configured to output the fault indication based on a selected proportion of the position vectors being outside of the region.

4. The system of claim 1, wherein each classifier is a one-class classifier, and the class is a healthy class representing normal operation of the respective vehicle subsystem.

5. The system of claim 4, wherein the processing device is configured to:
determine, for each one-class classifier, whether the respective subset belongs to the healthy class; and
based on at least one classifier determining that the respective subset does not belong to the healthy class, identify which of the plurality of vehicle subsystems has a contribution to the malfunction.

6. The system of claim 5, wherein the plurality of one-class classifiers includes an air subsystem classifier, a fuel subsystem classifier and an ignition subsystem classifier.

7. The system of claim 1, wherein the plurality of machine learning classifiers includes a plurality of two-dimensional one-class classifiers, each one-class classifier configured to receive a subset of the measurement data for a pair of parameters, and the processing device is configured to identify one or more individual components or vehicle subsystem as having a contribution to the malfunction by comparing outputs from the plurality of one-class classifiers to a knowledge base.

8. The system of claim 1, wherein the plurality of machine learning classifiers includes a two-class classifier having a healthy class associated with normal operation of the vehicle subsystem, and a faulty class.

9. The system of claim 1, wherein the plurality of machine learning classifiers includes a multi-class classifier having at least three classes associated with a plurality of vehicle subsystems and/or components.

10. The system of claim 9, wherein the at least three classes include a healthy class associated with normal operation of all of the plurality of vehicle subsystems or components, and a faulty class for each vehicle subsystem and/or component.

11. A method of monitoring operation of a vehicle, comprising:
receiving measurement data from a plurality of sensing devices by a processing device, each sensing device of the plurality of sensing devices configured to measure a parameter of a vehicle system, the measurement data having a plurality of subsets, the processing device including a plurality of machine learning classifiers, each classifier of the plurality of machine learning classifiers associated with a different vehicle subsystem of a plurality of vehicle subsystems;
in response to detection of a malfunction in the vehicle, inputting at least a respective subset of the plurality of subsets to each classifier, wherein each classifier is configured to define a class associated with normal operation of the a respective vehicle subsystem;
determining by each classifier whether the respective subset of the measurement data belongs to the class; and
based on one or more classifiers determining that at least a selected amount of the subset of the measurement data is outside of the class, outputting a fault indication, the fault indication identifying which of the plurality of vehicle subsystems has a contribution to the malfunction.

12. The method of claim 11, wherein each classifier is configured to plot the respective subset of the measurement data as position vectors in a feature space having axes representing parameters related to operation of the vehicle subsystem, the feature space including a boundary that defines a region of the feature space associated with a healthy condition of the vehicle subsystem.

13. The method of claim 12, further comprising outputting the fault indication from the classifier based on a selected proportion of the position vectors being outside of the region.

14. The method of claim 11, wherein each classifier is a one-class classifier, and the class is a healthy class representing normal operation of the respective vehicle subsystem.

15. The method of claim 14, further comprising:
determining, for each one-class classifier, whether the respective subset belongs to the healthy class; and
based on at least one classifier determining that the respective subset does not belong to the healthy class, identifying which of the plurality of vehicle subsystems has a contribution to the malfunction.

16. The method of claim 15, wherein the plurality of one-class classifiers includes an air subsystem classifier, a fuel subsystem classifier and an ignition subsystem classifier.

17. The method of claim 11, wherein the plurality of machine learning classifiers includes a plurality of two-dimensional one-class classifiers, each one-class classifier configured to receive a subset of the measurement data for a pair of parameters, the method further comprising identifying one or more individual components or vehicle subsystem as having a contribution to the malfunction by comparing outputs from the plurality of one-class classifiers to a knowledge base.

18. The method of claim 11, wherein the plurality of machine learning classifiers includes a two-class classifier having a healthy class associated with normal operation of the vehicle subsystem, and a faulty class.

19. The method of claim 11, wherein the plurality of machine learning classifiers includes a multi-class classifier having at least three classes associated with a plurality of vehicle subsystems and/or components.

20. The method of claim 19, wherein the at least three classes include a healthy class associated with normal operation of all of the plurality of vehicle subsystems or components, and a faulty class for each vehicle subsystem and/or component.

* * * * *